United States Patent
Hammond

(10) Patent No.: US 7,183,242 B2
(45) Date of Patent: Feb. 27, 2007

(54) LUBRICANT SYSTEM FOR USE IN POWDERED METALS

(75) Inventor: Dennis L. Hammond, Richfield, OH (US)

(73) Assignee: Apex Advanced Technologies, LLC, Cleveland, OH (US)

(\*) Notice: Subject to any disclaimer, the term of this patent is extended or adjusted under 35 U.S.C. 154(b) by 430 days.

(21) Appl. No.: 10/720,590

(22) Filed: Nov. 24, 2003

(65) Prior Publication Data

US 2004/0077508 A1 Apr. 22, 2004

Related U.S. Application Data

(62) Division of application No. 10/217,137, filed on Aug. 12, 2002, now Pat. No. 6,679,935.

(60) Provisional application No. 60/312,310, filed on Aug. 14, 2001.

(51) Int. Cl.
*C10M 141/06* (2006.01)
*C10M 133/22* (2006.01)

(52) U.S. Cl. ............... 508/454; 508/527; 508/539; 508/550; 508/551

(58) Field of Classification Search ............ 508/550
See application file for complete search history.

(56) References Cited

U.S. PATENT DOCUMENTS

| | | | |
|---|---|---|---|
| 3,915,870 A * | 10/1975 | Brown | 508/125 |
| 4,002,474 A | 1/1977 | Blachford | |
| 4,106,932 A | 8/1978 | Blachford | |
| 4,948,523 A * | 8/1990 | Hutchison et al. | 508/273 |
| 5,154,881 A | 10/1992 | Rutz et al. | |
| 5,590,387 A * | 12/1996 | Schmidt et al. | 419/36 |
| 5,744,433 A | 4/1998 | Storstrom et al. | |
| 6,093,761 A | 7/2000 | Schofalvi | |
| 6,303,547 B1 | 10/2001 | Balasubramaniam | |
| 6,376,585 B1 | 4/2002 | Schofalvi et al. | |
| 6,444,622 B1 * | 9/2002 | Balasubramaniam | 508/187 |
| 6,679,935 B2 * | 1/2004 | Hammond | 75/252 |
| 6,846,862 B2 * | 1/2005 | Schofalvi et al. | 524/195 |

\* cited by examiner

*Primary Examiner*—Ellen M. McAvoy
(74) *Attorney, Agent, or Firm*—Rankin, Hill, Porter & Clark LLP

(57) ABSTRACT

The present invention provides a lubricant system in the pressing of powders to form a part. The lubricant system is a solid at ambient conditions. However, upon application of pressure during the pressing of the metal parts, the lubricant system forms a liquid phase along the walls of cavity in which the powder is being pressed.

12 Claims, No Drawings

LUBRICANT SYSTEM FOR USE IN POWDERED METALS

This application claims priority to provisional application Ser. No. 60/312,310 filed Aug. 14, 2001 and non-provisional application Ser. No. 10/217,137 filed Aug. 12, 2002 both now U.S. Pat. No. 6,679,935 entitled LUBRICANT SYSTEM FOR USE IN POWDERED METALS.

FIELD OF INVENTION

The present invention concerns a lubricant system. More particularly, the present invention concerns a lubricant system for use in powder metal compositions that are used in the production of metal parts.

BACKGROUND OF THE INVENTION

The use of powder metal compositions to produce metal products is well-known in the prior art. Powder metals (powder metallurgy) is commonly employed in applications wherein casting, forging or other metal processing techniques is not cost effective. The fabrication of parts using powder metals includes the steps of placing the metal composition in the cavity of a mold, pressing the composition to form a green part, removing the green part from the cavity, and firing the green part.

During the pressing operation, it is generally important that a lubricant be employed in order to facilitate the removal of the green part from the cavity and allow for the slippage of particles against each other so that forces are spread uniformly and density can be made to be as uniform as possible in the cross-section of the pressed part. Generally, in the prior art there are two separate approaches to the use of lubricants. One approach is to apply the lubricant to the wall of the mold cavity prior to adding the metal composition to the cavity, with the metal composition having a relatively low level of lubricant. The downside to this approach is that it is time-consuming to apply a uniform coating of a liquid lubricant to the cavity walls. The second approach is to incorporate a relatively higher level of lubricant into the powder metal composition. However, the use of prior art lubricants results in several adverse effects. Specifically, such lubricants reduce the flow of the powder metal into the mold cavity thereby slowing the pressing operation. Lubricants can also detrimentally impact green density and result in the evolution of undesirable effluents during preheat and the sintering operation. Lubricants can also contribute to low final density in parts, protracted furnace time, and the formation of cracks and blisters during firing.

The present invention provides a lubricant system that overcomes the deficiencies of the prior art lubricant systems.

SUMMARY OF THE INVENTION

The present invention provides a new and improved lubricant system for use in powder metallurgy. The lubricant system is solid at ambient conditions, but upon application of press pressure (forming pressure and stress) it transforms to a liquid phase. The lubricant system provides an excellent lubricant for use in powder metals for it results in good flow of the powder composition, low loading requirements, shorter furnace times, ease of removal of the green part from the mold cavity and the formation of minimal effluents during heating. In addition to the lubricant system, the present invention also provides a metal mixture and method of using the same. The lubricant system of the present invention may also be used in connection with the pressing of ceramic powders.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

The lubricant system of the present invention is a solid at ambient conditions. Thus, the lubricant system is a solid when it is mixed with the powder metal. However, when pressure and stress is applied to the lubricant system during the pressing of the metal composition, it must be capable of transforming at least in part to a liquid phase along the walls of the mold cavity.

There are various compositions that will work in accordance with the invention. Preferably, the major components of the lubricant system display solubility with one another in the melt state. The melt points of the components of the lubricant system are depressed during melting, possibly forming some type of eutectic.

It is normal for a solid material to have an increase in melting point as pressure is applied. There are other exceptions however. The Clapeyron-Clausius thermodynamic equation predicts that when the density of a material in its solid state is less than the density of a substance in its liquid state, then the melting point of that substance will decrease when pressure is increased. Applicant believes that this equation may be used to predict material systems suitable for use in the present invention.

Applicant has found that materials that work flow under pressure and shear, flow better with increased shear and temperature, are partially crystalline at room temperature. Transformation of a lubricant system to a liquid phase, preferably takes place at about 4 tons per square inch at room temperature, a very low end of the working pressure of a press. The faster a press runs, the more shear is generated and temperature due to particle-to-particle friction. Both of these actions reduce the viscosity of a lubricant system. Normal press operations impart to a part a temperature of about 90° to about 140° F. Thus, applicant has found that a lubricant system that displays a viscosity range of from about 1000 to about 6000 poise at a shear rate of 1000/second and a temperature of 100° F., performs well. By taking advantage of the shear thinning properties of the lubricant system, non-dusting metal mixes can be made without the use of solvents, thereby also resulting in metal mixes with reduced segregation of components, and the loss and segregation of minor ingredients. Also, preferably there is a strong attraction by the lubricant system to the surface of the metal particles. Further, preferably the lubricant system cleanly burns during the firing or sintering of the green part, with no formation of undesired residual metals or undesired reduced metals. Additionally, the lubricant system of the present invention permits the operation of presses at much greater loads leading to improved green densities and parts free of defects such as blisters and delaminations.

One lubricant system that performs in accordance with the requirements of the present invention comprises a fatty acid material. The lubricant system may also include a wax, and in one preferred embodiment the lubricant system comprises a guanidine material. The wax may be synthetic or natural. One preferred synthetic wax is an amide wax.

The fatty acid material of the present invention comprises a carboxylic acid derived from or contained in an animal or vegetable fat or oil. Preferably, the fatty acid material comprises an unsaturated fatty acid or a mixture of such acids, and salts thereof such as lithium stearate. Examples of suitable unsaturated fatty acids include butyric acid, lauric acid, palmitic acid and stearic acid. More preferably, the fatty acid material comprises a mixture of lauric acid, palmitic acid and stearic acid. The fatty acid may also comprise a fatty acid ester such as, for example, glycerol monostearate or butyl stearate.

In one embodiment, the guanidine material is a reaction product of guanidine and an acid selected from a fatty acid, an organic acid, or a stronger acid. The guanidine material is a reaction product which may be an amide or actually may be more in the nature of a hydrated salt. For example, according to the CRC Handbook of Chemistry and Physics, 74th Ed., guanidine acetate has the formula $(H_2N)2$, $C=NH.CH_3COOH$, rather than an amide-type formula such as $H_2N-C=NH(NH)COCH_3$, as would be expected for an amide. This is due to the fact that guanidine is a very strong base, and is much more likely to simply abstract a proton from a relatively weak organic acid, rather than react with the organic acid in a "standard" amidization reaction forming an amide with concomitant loss of $H_2O$. However, in some cases, the reaction of guanidine and the acid may yield an amide in the "standard" manner. For this reason, the guanidine material of the present invention will be referred to herein as the reaction product of guanidine and an acid. The term "reaction product of guanidine and an acid" includes both of the above-described forms of the product of a reaction between or mixture of guanidine and an acid, and mixtures of these forms or other possible forms.

The particular acid used to make the reaction product of guanidine and an acid is selected based upon obtaining desired effects when mixed with other compounds. In one embodiment, the guanidine material is guanidine stearate. In one embodiment, the guanidine material includes guanidine ethyl-hexanoate. In other embodiments, the guanidine material may be the reaction product of guanidine and other acids. The many acids which may be reacted with the guanidine to form the reaction product of guanidine and an acid are described in detail hereafter.

According to the present invention, the guanidine material may include the reaction product of guanidine and organic acids in the $C_{12}$ to $C_{22}$ range. Thus, for example the reaction product of guanidine and oleic acid ($C_{17}H_{33}CO_2H$) would be suitable. Other suitable acids include such saturated fatty acids as (common names in parentheses) dodecanoic (lauric) acid, tridecanoic (tridecylic) acid, tetradecanoic (myristic) acid, pentadecanoic (pentadecylic) acid, hexadecanoic (palmitic) acid, heptadecanoic (margaric) acid, octadecanoic (stearic) acid, eicosanoic (arachidic) acid, 3,7,11,15-tetramethylhexadecanoic (phytanic) acid, monounsaturated, diunsaturated, triunsaturated and tetraunsaturated analogs of the foregoing saturated fatty acids. Additional organic acids include acids such as ethylhexanoic acid ($C_7H_{15}CO_2H$), hexanoic acid, heptanoic acid, octanoic acid, nonanoic acid, decanoic acid, and dodecanoic acid. Branched-chain carboxylic acids in the $C_6$ to $C_{12}$ range may also be used.

According to the present invention, the reaction product of guanidine and stronger acids such as sulfonates, phthalates, benzoates, phosphates and phenbls may be used. For example, the reaction product of guanidine and an acid such as benzenesulfonic acid may be used. As an alternative, intermediate acids may be selected for reaction with guanidine. Alternatively, the guanidine material used in the lubricant composition may be the reaction product of guanidine and a weaker acid such as benzoic acid.

In a preferred embodiment, the guanidine material comprises a mixture of guanidine stearate and guanidine ethyl-hexanoate.

Synthetic waxes may also be used in the lubricant system of the present invention. Examples of such synthetic waxes include petroleum waxes such as, for example, microcrystalline waxes and ethylene waxes, including ethylene copolymer waxes.

A preferred amide wax for use in the present invention is an ethylenebisamide wax. The ethylenebisamide wax is a wax formed by the amidization reaction of ethylene diamine and a fatty acid. The fatty acid may be in the range from $C_{12}$ to $C_{22}$, but is usually made from stearic acid, the saturated $C_{18}$ fatty acid. Thus, in one preferred embodiment, the ethylenebisamide wax is ethylenebisstearamide wax. Ethylenebisstearamide has a discrete melting point of about 142° C. The ethylenebisamide wax preferably has a discrete melting point in the range from about 120° C. to about 160° C.

In other embodiments of the lubricant composition, other ethylenebisamides include the bisamides formed from the fatty acids ranging from $C_{12}$ to $C_{30}$. Illustrative of these acids are lauric acid, palmitic acid, oleic acid, linoleic acid, linolenic acid, oleostearic acid, stearic acid, myristic acid and undecalinic acid. Unsaturated forms of these fatty acids may also be used.

In one embodiment, the ethylenebisstearamide is ACRAWAX® C, available from LONZA, Inc. ACRAWAX® C has a discrete melt temperature of 142° C.

Any of a variety of metal powders may be used in the present invention. Such metal powders include metallic (including alloys), metal oxide and intermetallic powders. Examples of common commercial metal powders include steel powders, stainless steel powders, nickel, copper and brass. In addition to metal powders, applicant believes that the lubricant system of the present invention is suitable for use in conjunction with ceramic powders. Applicant hereby incorporates by reference U.S. Pat. No. 6,093,761, especially for its teachings relative to inorganic powders. The powders of '761 may be employed in conjunction with the present lubricant system.

In one embodiment, the lubricant system comprises by weight from about 5% to about 35% fatty acid and from about 0.5% to about 50% guanidine material. In another embodiment, the lubricant system includes by weight from about 30% to about 65% amide wax. In one preferred embodiment the lubricant system comprises by weight from about 5% to about 15% by weight lauric acid, from about 5% to about 15% by weight stearic acid, from about 40% to about 60% amide wax and from about 25% to about 40% guanidine material. Preferably, the guanidine material comprises a mixture of guanidine stearate and guanidine ethyl-hexanoate. In one embodiment the guanidine stearate comprises by weight 10% to about 25% of the lubricant system, and the guanidine ethyl-hexanoate comprises about 10% to about 20% of the lubricant system.

In another embodiment the lubricant comprises by weight from about 15% to about 30% ethylene wax. In another embodiment the lubricant system may comprise by weight from about 30% to about 70% amide wax and from about 5% to about 20% ethylene wax and up to about 30% fatty acid material. In yet another embodiment, the lubricant system may comprise by weight from about 30% to about 70% of a fatty acid metal salt and up to about 35% fatty acid material, and up to about 30% of an ethylene wax.

The lubricant system is produced by first pregrinding the fatty acids to a particle size of about 100 mesh. A Waring Blender or other type of grinding apparatus may be used. The fatty acids are then mixed with the remaining components. Preferably, a double cone mixing step is used followed by melt mixing in an extruder. For small batches of lubricant, it is possible to simply do a batch melt of a homogeneous mixture. Finally, the melt mixed product is preferably cryogenically ground to provide a particle size of about 10 to about 25μ microns.

Applicant has found that the rate of cooling of the lubricant melt affects the viscosity of the resultant material, and thus cooling rate can be utilized to control and obtain the desired viscosity of the lubricant system.

The lubricant system may be mixed with the powders that are to be processed using conventional techniques. For example, a double cone mixer may be used to mix the powder and the lubricant either in a ready-to-use mix or a master (concentrated) mix. Also, the lubricant system may be used in various methods for forming a part including injection molding and standard pressing operations. Such methods generally include the steps of placing the powder composition in a mold having a cavity, applying pressure to the composition to form a green part, removing the green part from the mold, and sintering the part to form a finished part. During the pressing operation, a portion of the lubricant system converts from a solid to a liquid phase. The sintering step is conventional, and it is common to employ a preheat step wherein a majority of the lubricant system is burned out of the green part. However, use of the present lubricant system results in significantly less furnace time, which is a major cost saving feature for the end-user. Of course, the exact heating profile is primarily a function of the composition of the powders being processed, loading density and speed of processing.

When mixed with the metal powders, the concentration of the lubricant to the entire powder system is preferably in the range of about 0.10 to about 0.5 percent by weight. This loading is significantly less than prior art lubricants wherein loadings of about 0.5–1.5% by weight of the total powder system are typical. Thus, the lubricant system of the present invention offers a significant reduction (generally 50% or greater reduction) in the amount of lubricant used compared to traditionally used lubricants due to the efficiency of lubrication from the transformation from a solid to a liquid.

Because less lubricant is utilized, green density increases due to less volume of lubricant and due to particle-to-particle rearrangement caused by slippage at low pressure. Final part properties improve as green density improves (e.g., sintered density, strength, hardness, greater uniformity and fewer defects). By use of the lubricant system of the present invention, excellent green densities are achieved without the use of special equipment such as added heating devices as used in conventional hot pressing or the use of die wall lubricating systems.

The transformation of the lubricant system from a solid to a liquid allows for higher press pressures without the formation of micro-cracks and delamination. During the pressing operation the lubricant is pressed to the die well, and helps to lower ejection forces. Because there is less lubricant used in the green parts, there is significantly less gas evolution during sintering, giving an operator the flexibility to increase loads, modify processing speeds and modify the amount of carrier gas used during sintering. Specifically, for example, applicant has seen as high as 70% reduction in gas evolution using a lubricant system made in accordance with the present invention (which made parts at a 0.3% by weight loading) as compared to a conventional lubricant such as ACRAWAX® (which required a loading of 0.75% by weight). Applicant has also found that the lubricant system is removed at a fairly steady rate over the entire de-lube heating cycle of the green part, whereas, with conventional lubricants meaningful removal generally only occurs at the higher temperatures of the cycle and at much greater rates as compared to the lubricant system of the present invention. Thus, the lubricant system of the present invention is especially useful with metal powder systems containing nickel, for with such powder systems crack and blister formation is a problem during elevated de-lubing temperatures wherein high lubricant removal rates are experienced.

It will be appreciated that other additives may be used in conjunction with the lubricant system of the present invention. For example, sinter aids or small additions of alloying metals maybe added to powder system. Also, it will be appreciated that the lubricant system maybe supplied in a concentrated form (master mix) and then let-down by the end user. For example, a master mix comprising by weight 1% to 20% lubricant and 80% to 99% powder could be supplied, and the end user could then add powder to bring the lubricant down to the 0.10% to 0.5% range.

It will also be appreciated that the lubricant system of the present invention may be used as a die wall lubricant and thus be applied directly to the walls of the cavity wherein the green part is being formed.

The following examples serve to illustrate the invention, but they are not intended to limit it thereto.

EXAMPLE I

Preparation of Lubricant System

A mixture was prepared comprising by weight the following components:

| | |
|---|---|
| 10% | lauric acid |
| 10% | stearic acid (impure comprising about 45% by weight palmitic acid) |
| 50% | ACRAWAX ® C-Lonza, Inc. |
| 13.5% | guanidine stearate |
| 16.5% | guanidine ethyl-hexanoate |

The laurie and stearic acids were preground in a Waring Blender to a particle size of about 100 mesh. All components were then double cone mixed followed by melt mixing at 60° C. The melt mixed product was then cryogenically ground to provide a particle size of about 10 to about 25 microns.

EXAMPLE II

Preparation of Metal Mixes Using Lubricant System and Comparative Material

A metal mix of the lubricant of Example I was prepared and processed as follows.

Nine parts by weight 409CS stainless steel powder to 1 part lubricant of Example 1 were hand mixed to remove agglomerates to provide a master mix. The master mix was then let down in a double cone mixer with additional stainless steel powder to provide a final mix comprising 0.20% by weight lubricant. The mix provided the following properties.

Lubricant In 409CS Stainless Steel

| | Lubricant (by weight) | |
|---|---|---|
| | 0.20% of Example I | (comparative) 0.75% ACRAWAX ® C |
| Property (Powder) | | |
| Apparent Density (g/cm³) | 3.09 | 2.93 |
| Flow Rate (seconds) | 24.89 | 29.77 |
| Property (Green) 30 tsi Press | | |
| Density (g/cm³)* | 5.700 | 5.692 |
| Eject Force (lb.) | 2450 | 1705 |
| Green Strength (psi) | 1454 | 1747 |
| Property (sintered) | | |
| Density (g/cm³)** | 6.341 | 6.422 |
| Carbon % | 0.0267 | 0.0263 |
| Property (Green) 40 tsi Press | | |
| Density (g/cm³)* | 6.085 | 6.153 |
| Eject Force (lb.) | 3850 | 2325 |
| Green Strength (psi) | 2573 | 2407 |
| Property (sintered)*** | | |
| Density (g/cm³)** | 6.661 | 6.680 |
| Carbon % | 0.0278 | 0.0250 |
| Property (Green) 48 tsi Press | | |
| Density (g/cm³)* | 6.284 | 6.363 |
| Eject Force (lb.) | 4750 | 2927 |
| Green Strength (psi) | 3130 | 3260 |
| Property (sintered)*** | | |
| Density (g/cm³)** | 6.883 | 6.837 |
| Carbon % | 0.0294 | 0.0276 |

*Calculated density
**Sintered density by water displacement
***Sintered at 2450° F. for 30 minutes in 70% $H_2$; 30% $N_2$
All test samples were standard transverse rupture bars (1¼" × ½" × ¼")

EXAMPLE III

Additional Lubricant Systems

Additional lubricant systems made in accordance with the present invention A, B, C, D and E were prepared by mixing the components followed by batch melting. After melting the material was cooled and then cryogenically ground to about 10 to about 25 microns. The systems comprised by weight the following components:

| Component | A | B | C | D | E |
|---|---|---|---|---|---|
| Lauric Acid | 10.0 | 5.0 | 15.0 | 10.0 | |
| Stearic Acid (Impure comprising about 45% by weight palmitic acid) | 10.0 | 15.0 | 15.0 | 10.0 | |
| ACRAWAX ® C Lonza, Inc. | 50.0 | 50.0 | | 50.0 | 50.0 |
| Guanidine Stearate | .45 | | | 12.3 | 0.45 |
| Guanidine Ethyl-hexanoate | 0.55 | | | 17.7 | 0.55 |
| Micro-crystalline Wax M7381 Moore & Munger Marketing, Inc. | 11.9 | 12.0 | 10.0 | | 12 |
| Polyethylene Copolymer Wax 520 Clariant Corporation | 17.1 | 18.0 | 10.0 | | 18 |
| Butyl Stearate Wax (Liquid) | | | | | 9.5 |
| Lithium Stearate¹ | | | 50.0 | | |
| Glycerol Monostearate-Emerest 240 Cognis Corporation | | | | | 9.5 |

¹Mixture by weight of 86.4% stearic acid and 13.6% lithium hydroxide monohydrate

EXAMPLE IV

Metal mixes were made with conventional lubricants and with lubricant systems made in accordance with the present invention (lubricant system A of Example III). The mixes provided the following properties which clearly show that the lubricant system made in accordance with the present invention performs substantially as well or better than conventional lubricants used at much higher loadings.

Lubricant System And Metal Powder

| Properties | 129 L U.S. Bronze¹ 0.75%⁵ (Conventional) (40 TSI) | 129 L U.S. Bronze¹ 0.30% A (40 TSI) | Hoeganes 85 HP² 0.75% ACRAWAX ® (Conventional) (60 TSI) | Hoeganes 85 HP² 0.25% A (60 TSI) | Ampal AMB 2712 PMP³ 1.5% ACRAWAX ® (Conventional) (30 TSI) | Ampal AMB 2712 PMP³ 0.30% A (30 TSI) | Ametek 304 L⁴ 1.00% ACRAWAX ® (Conventional) (60 TSI) | Ametek 304 L⁴ 0.25% A (60 TSI) |
|---|---|---|---|---|---|---|---|---|
| Green Density | 7.72 g/cc | 7.76 g/cc | 7.22 g/cc | 7.35 g/cc | 2.64 g/cc | 2.67 g/cc | 6.80 g/cc | 6.80 g/cc |
| Green Strength | 1804 psi | 2887 psi | 1874 psi | 2034 | 997 | 1533 psi | 1447 psi | 1223 psi |
| Green Spring | 0.26% | 0.23% | 0.28% | 0.30% | 0.17% | 0.25% | 0.35% | 0.41 |
| Break-away Ejected Pressure | 1533 lbf | 1637 lbf | 2584 lbf | 3217 lbf | 889 lbf | 1528 lbf | 2682 lbf | 3374 lbf |
| Peak Stripping Pressure | 2057 lbf | 1952 lbf | 2092 lbf | 2742 lbf | 842 lbf | 1408 lbf | 2375 lbf | 2867 lbf |

¹78% copper, 20.5% zinc, 1.5% lead (by weight)
²Iron base with 2.0% nickel and 0.5% carbon (by weight)
³Proprietary blend of aluminum, copper, magnesium and silica
⁴Proprietary 304 stainless steel
⁵Equal blend by weight of zinc stearate and lithium stearate
TSI = Tons Per Square Inch While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What is claimed is:

1. A solid lubricant system for use in the production of metal powder compacted parts, said solid lubricant system comprising:
   (a) about 0.5 wt % to about 50 wt % of a guanidine material,
   (b) about 5 wt % to about 35 wt % of a fatty acid,
   (c) about 30 wt % to about 65 wt % of an amide wax
   (d) wherein said solid lubricant system is capable of forming a liquid phase upon application of pressure, and
   (e) wherein said solid lubricant system exhibits a viscosity of from about 1000 to about 6000 poise at a shear rate of 1000/second and a temperature of about 100° F.

2. The solid lubricant system of claim 1 wherein said fatty acid comprises lithium stearate.

3. A The solid lubricant system of claim 1 for use as a die wall lubricant.

4. The solid lubricant system of claim 1 comprising a synthetic wax and a fatty acid ester.

5. The solid lubricant system of claim 1 wherein said fatty acid comprises stearic acid.

6. The solid lubricant system of claim 1 wherein said fatty acid comprises lauric acid.

7. The solid lubricant system of claim 1 wherein said fatty acid comprises a mixture of stearic acid, palmitic acid and lauric acid.

8. The solid lubricant system of claim 1 wherein said guanidine material comprises guanidine stearate.

9. The solid lubricant system of claim 1 wherein said guanidine material comprises guanidine ethyl-hexanoate.

10. The solid lubricant system of claim 1 wherein said guanidine material comprises a mixture of guanidine stearate and guanidine ethyl-hexanoate.

11. A solid lubricant system for use in the production of metal powder compacted parts, said solid lubricant system consisting of:
    (a) about 0.5 wt % to about 50 wt % of a guanidine material,
    (b) about 5 wt % to about 35 wt % of a fatty acid, and
    (c) about 30 wt % to about 65 wt % of an amide wax.

12. The lubricant system of 11 wherein said lubricant system is capable of forming a liquid phase upon application of pressure, and wherein said lubricant system exhibits a viscosity of from about 1000 to about 6000 poise at a shear rate of 1000/second.

* * * * *